United States Patent [19]
Kercher

[11] Patent Number: 5,695,321
[45] Date of Patent: Dec. 9, 1997

[54] TURBINE BLADE HAVING VARIABLE CONFIGURATION TURBULATORS

[75] Inventor: David Max Kercher, Ipswich, Mass.

[73] Assignee: General Electric Company, Cincinnati, Ohio

[21] Appl. No.: 809,603

[22] Filed: Dec. 17, 1991

[51] Int. Cl.$^6$ ............................................. F01D 5/18
[52] U.S. Cl. .................. 416/97 R; 416/96 A; 415/115
[58] Field of Search ..................... 415/115; 416/97 R, 416/96 A, 232, 233; 89/14.1

[56] References Cited

U.S. PATENT DOCUMENTS

| | | | |
|---|---|---|---|
| 3,628,885 | 12/1971 | Sidenstick et al. | 416/97 |
| 4,180,373 | 12/1979 | Moore et al. | 416/97 R |
| 4,236,870 | 12/1980 | Hucul, Jr. et al. | 416/97 R |
| 4,257,737 | 3/1981 | Andress et al. | 416/97 R |
| 4,278,400 | 7/1981 | Yamarik et al. | 416/97 R |
| 4,416,585 | 11/1983 | Abdel-Messeh | 416/97 R |
| 4,474,532 | 10/1984 | Pazder | 416/97 R |
| 4,514,144 | 4/1985 | Lee | 416/96 R |
| 4,515,526 | 5/1985 | Levengood | 416/96 R |
| 4,775,296 | 10/1988 | Schwarzmann et al. | 415/115 |
| 4,992,026 | 2/1991 | Ohtomo et al. | 415/115 |
| 5,052,889 | 10/1991 | Abdel-Messeh | 416/97 R |

FOREIGN PATENT DOCUMENTS

2112467  7/1983  United Kingdom .............. F01D 5/18

OTHER PUBLICATIONS

J.C. Han et al, "Augmented Heat Transfer in Square Channels With Parallel, Crossed, and V-Shaped Angled Ribs," submitted to ASME Journal of Heat Transfer, Jun. 1990, pp. 1-23 and Figures 1-13.

S.D. Spring, "Improved Methods For Determining Heat Transfer," The Leading Edge, Winter 1987/1988, Contents page and pp. 4-9.

Metzger-Vedula-Breen,"The Effect of Rib Angle and Length on Convectio Heat Transfer in Rib-Roughened Triangular Ducts," ASME-JSME Thermal Engineering Conference vol. 3, 1987,pp.:327-333.

Metzger-Fan-Yu, "Effects of Rib Angle and Orientation on Local Heat Transfer in Square Channels with Angled Roughness Ribs", *Compact Heat Exchangers*, copyright 1989, pp.: Title and 151-167.

*Primary Examiner*—Michael J. Carone
*Assistant Examiner*—Theresa M. Wesson
*Attorney, Agent, or Firm*—Andrew C. Hess; Wayne O. Traynham

[57] ABSTRACT

A turbine blade includes an airfoil having opposite first and second sides and an internal passage extending longitudinally therebetween. A plurality of turbulator ribs extend from the first side into the passage and have substantially identical configurations including first and second ends having a span axis extending therebetween, first and second sides having a width therebetween, and a base and a tip having a height e measured therebetween. The passage includes a height H for defining a rib-to-passage height ratio e/H. Adjacent ribs are spaced apart at a longitudinal spacing S for defining a rib spacing-to-height ratio S/e. The rib configuration varies along the span axis between the rib first and second ends for correspondingly varying at least one of the ratios e/H and S/e to effect a varying convective heat transfer enhancement along the rib span axis for increasing enhancement and reducing cooling airflow.

10 Claims, 12 Drawing Sheets

TURBINE BLADE HAVING VARIABLE CONFIGURATION TURBULATORS

TECHNICAL FIELD

The present invention relates generally to gas turbine engines, and, more specifically, to air cooled turbine blades and vanes therein.

BACKGROUND ART

In a conventional gas turbine engine, a compressor pressurizes air which is channeled to a combustor, mixed with fuel, and ignited for generating combustion gases which flow to a turbine disposed downstream therefrom. The turbine extracts energy from the hot combustion gases for powering the compressor. Energy from the combustion gases is also used to propel an aircraft in flight, with one or more turbines either driving a conventional fan for obtaining thrust, or simply discharging the combustion gases from a conventional exhaust nozzle for generating thrust for powering the aircraft.

Conventional turbines include one or more stages of stationary stator nozzles or vanes and rotating rotor blades which typically extract energy from the combustion gases by reaction. The blades and vanes are typically air cooled by a portion of the air pressurized by the compressor in order to provide acceptable life in the gas turbine engine. However, any portion of the compressed air which is utilized for cooling the blades and vanes is not available for undergoing combustion which, therefore, reduces the overall efficiency of the engine. Accordingly, it is desirable to use as little of the compressed air as possible in cooling the blades and vanes consistent with obtaining relatively long useful life of the blades and vanes, which is typically accomplished by providing heat transfer enhancement members such as elongate turbulator ribs within the blades and vanes.

Since gas turbine engine blades and vanes include an airfoil portion over which the combustion gases flow, which airfoil portion includes an internal passage for channeling the cooling air and also contains the turbulator ribs, the term blade as used herein shall mean any member placed within the gas turbine engine flowpath over which flows the combustion gases, such as conventional rotor blades or stator vanes or nozzles.

Turbulator ribs typically used in such blades are conventionally formed as part of the blade casting and project inwardly into the internal passage of the blade through which the cooling air is channeled. The ribs enhance the convective heat transfer coefficient along the inner surface of the blade by tripping or disrupting the cooling air boundary layer which is caused to separate from the internal surface and then reattach downstream from the rib. The heat transfer coefficient enhancement is conventionally defined as the convective heat transfer coefficient effected by the ribs divided by the convective heat transfer coefficient over a smooth surface without turbulator ribs, and has values ranging up to several times that of the latter.

Enhancement is conventionally related to the height or projection of the ribs into the internal passage, the distance between opposing walls of the internal passage, and the distance or spacing longitudinally between the ribs. The typical ratio of longitudinal spacing between turbulator ribs relative to rib height ranges from about 5.0 to about 10.0, and the ratio of the rib height to opposing wall distance has values of about 0.07 and up. And, exemplary turbulator ribs may include ribs disposed perpendicularly to the direction of cooling flow, ribs inclined relative to the direction of the cooling airflow, and ribs disposed on opposite walls of the internal passage that are longitudinally positioned either in-line or staggered with respect to each other.

Turbulator ribs provide localized increases in enhancement which decrease rapidly in value downstream from each individual rib. Accordingly, the ribs are typically uniform in configuration, uniform in height or projection into the internal passage, and uniform in longitudinal spacing therebetween for obtaining a generally uniform, or average, enhancement along the surface of the blade cooled by the ribs.

The various conventional turbulator ribs result in different amounts of enhancement, along with pressure losses associated therewith. Since the ribs project into the internal passage and partially obstruct the free flow of the cooling air therethrough, they provide resistance to the flow of the cooling air which results in pressure losses. Although higher ribs generally increase enhancement, the pressure drop associated therewith also increases, which, therefore, typically requires an increase in supply pressure of the cooling airflow to offset the pressure losses. Accordingly, the effectiveness of turbulator ribs must be evaluated by their ability to provide effective enhancement without undesirable levels of pressure losses associated therewith.

OBJECTS OF THE INVENTION

Accordingly, one object of the present invention is to provide a new and improved gas turbine engine blade.

Another object of the present invention is to provide a blade having improved turbulator ribs for increasing enhancement.

Another object of the present invention is to provide a blade having improved enhancement with a reduction in cooling airflow therein for improving blade life and performance of the gas turbine engine.

DISCLOSURE OF INVENTION

A turbine blade includes an airfoil having opposite first and second sides and an internal passage extending longitudinally therebetween. A plurality of turbulator ribs extend from the first side into the passage and have substantially identical configurations including first and second ends having a span axis extending therebetween, first and second sides having a width therebetween, and a base and a tip having a height $e$ measured therebetween. The passage includes a height $H$ for defining a rib-to-passage height ratio $e/H$. Adjacent ribs are spaced apart at a longitudinal spacing $S$ for defining a rib spacing-to-height ratio $S/e$. The rib configuration varies along the span axis between the rib first and second ends for correspondingly varying at least one of the ratios $e/H$ and $S/e$ to effect a varying convective heat transfer enhancement along the rib span axis.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
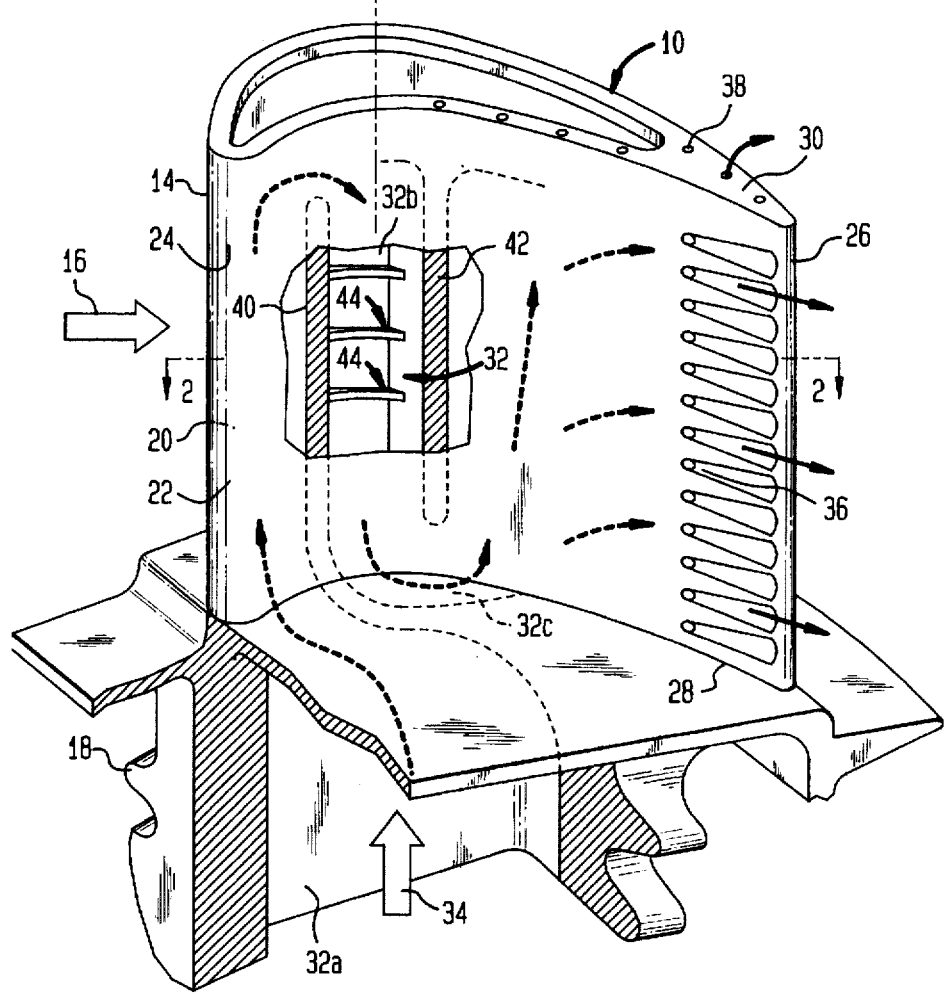
FIG. 1 is a schematic, perspective view, partly in section, of an exemplary gas turbine engine blade including turbulators in accordance with a first embodiment of the present invention.

Illustrated schematically in FIG. 1 is an exemplary gas turbine engine rotor blade 10 having a longitudinal or radial axis 12. The blade 10 includes an airfoil 14 which is conventionally disposed in a gas turbine engine (not shown) and over which flows hot combustion gases 16 generated by a conventional combustor (not shown). As used herein, the term blade shall mean any member disposed within a hot gas flow such as the combustion gases 16 and, for example, includes the rotor blade 10 illustrated, and stator vanes or nozzles. The blade 10 as a rotor blade is conventionally joined to a rotor disk (not shown) by a conventional dovetail 18 extending downwardly from the airfoil 14. The blade 10 may also represent a conventional stator vane or nozzle wherein the airfoil 14 is conventionally joined to a stator casing and conventionally channels the combustion gases 16 to conventional rotor blades disposed downstream therefrom (not shown).

The outer configuration of the airfoil 14 is conventional and includes a first sidewall, or side, 20, which is also known as the convex or suction side of the airfoil 14, and a second sidewall, or side, 22, which is also known as the concave or pressure side of the airfoil 14. The first and second sides 20 and 22 are joined together at a longitudinally extending leading edge 24 and a trailing edge 26 and extend longitudinally from a root 28 to a tip 30. The root 28 is the lowermost portion of the airfoil 14 over which the combustion gases 16 flow, and the tip 30 is the outermost portion of the airfoil 14 over which the gases 16 flow.

Figure 2:
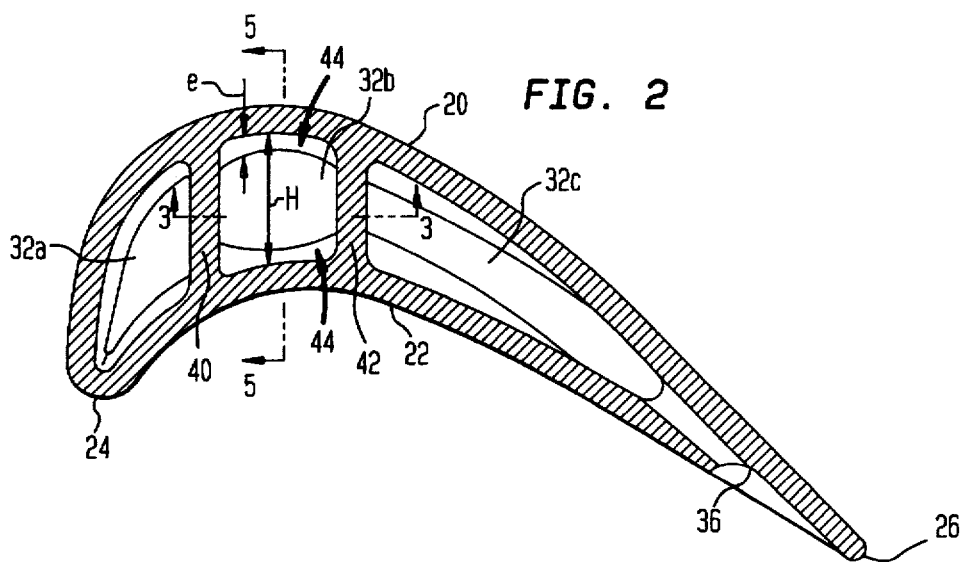
FIG. 2 is a transverse, partly sectional view of the blade illustrated in FIG. 1 taken along line 2—2.

Referring to both FIGS. 1 and 2, the airfoil 14 includes an internal passage 32 which extends longitudinally between the first and second sides 20 and 22 for channeling compressed air 34 as cooling air to cool the airfoil 14. More specifically, the cooling air 34 is conventionally channeled from a compressor of the gas turbine engine (not shown) through the dovetail 18 and upwardly into the airfoil 14. The passage 32 in the exemplary embodiment illustrated is a serpentine passage including a leading edge passage 32a which extends from the dovetail 18 upwardly through the airfoil 14 to the tip 30 wherein the air 34 is turned 180° into a midchord passage 32b and flows longitudinally downwardly in the airfoil 14 to the root 28 wherein the air 34 is again turned 180° upwardly into a trailing edge passage 32c which extends to the tip 30. The air 34 from the trailing edge passage 32c is conventionally discharged from the airfoil 14 through a plurality of trailing edge apertures 36 and tip holes 38 for example.

In the exemplary embodiment illustrated in FIGS. 1 and 2, the internal passage 32 is defined between the first and second sides 20 and 22, with the three portions thereof being additionally defined by an upwardly extending first partition 40 extending from the dovetail 18 longitudinally upwardly between the first and second sides 20 and 22 to form a gap with the tip 30 for allowing the air 34 to turn from the leading edge passage 32a downwardly into the midchord passage 32b. A second partition 42 is spaced aft of the first partition 40 and extends downwardly from the tip 30 toward the root 28 to form a gap adjacent to the dovetail 18 in which the cooling air 34 turns from the midchord passage 32b upwardly into the trailing edge passage 32c.

In an exemplary first embodiment of the present invention as illustrated in FIGS. 1 and 2, the longitudinal axis 12 extends parallel to the first and second partitions 40 and 42 and through the midchord passage 32b, which channels the cooling air 34 parallel to the longitudinal axis 12. A plurality of elongate turbulator ribs 44 extend perpendicularly away from the airfoil first side 20, and preferably also from the airfoil second side 22, inwardly into the midchord passage 32b and are disposed perpendicularly to the longitudinal axis 12, or the direction of flow of the cooling air 34 therein. The ribs 44 preferably have substantially identical configurations in the midchord passage 32b as shown in more particularity in FIGS. 3 and 4. Each of the ribs 44 includes first and second opposite ends 44a and 44b between which extends a longitudinal or span axis 46 of the rib 44, with the rib 44 having a length l measured along the span axis 46 between the first and second ends 44a and 44b. Each of the ribs 44 also includes a first, or upstream side 44c and an opposite second, or downstream side 44d, with a width w being measured transversely to the span axis 46 between the first and second sides 44c and 44d. Each of the ribs also includes a base 44e formed integrally with the inner surface of the first side 20, by being cast therewith, and a tip 44f disposed inwardly therefrom at a height e measured perpendicularly inwardly from the airfoil first side 20.

Figure 3:
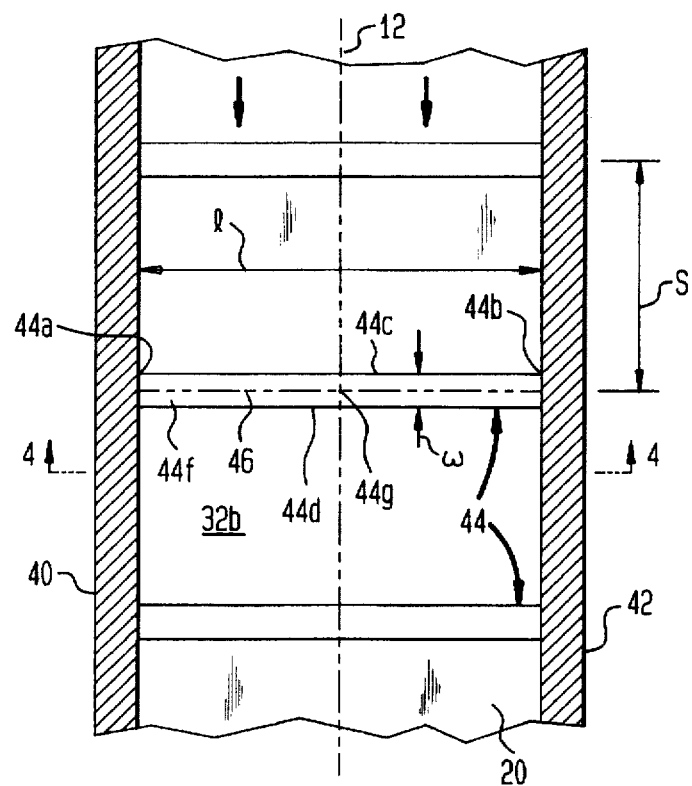
FIG. 3 is a longitudinal, partly sectional view of the midchord passage illustrated in FIG. 2 taken along line 3—3.

As shown in FIG. 2, the midchord passage 32b has a height H measured between the airfoil first and second sides 20 and 22 for defining a rib-to-passage height ratio e/H. In the exemplary embodiment illustrated, the midchord passage 32b is generally rectangular in transverse section with the passage height H varying slightly between the first and second partitions 40 and 42. As shown in FIG. 3, adjacent ones of the ribs 44 are spaced longitudinally apart in the midchord passage 32b at a longitudinal spacing S as measured from corresponding positions on the adjacent ribs 44, such as the centerlines thereof, for defining a rib spacing-to-height ratio S/e.

Turbulator ribs disposed perpendicularly to a cooling air flow are conventionally known for increasing the convective heat transfer coefficient along the surface of an externally heated member. The increase in heat transfer coefficient is conventionally known as enhancement, or the enhancement factor, which compares the convective heat transfer capability of a turbulator rib to that of a smooth wall without turbulator ribs, with values of enhancement varying from a minimum of 1 to several multiples of 1. The degree of enhancement is related to the ratios e/H and S/e, with a plurality of turbulator ribs providing an average enhancement therefrom.

Figure 4:
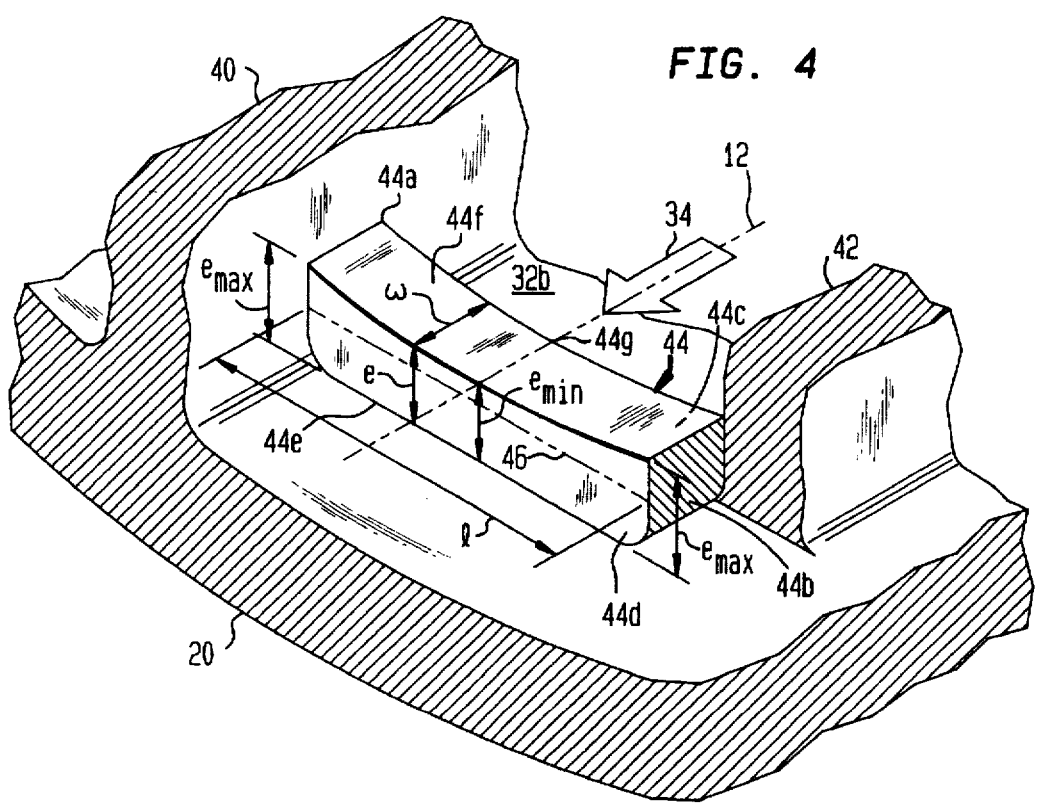
FIG. 4 is a perspective, partly sectional view of one of the turbulator ribs illustrated in the midchord passage shown in FIG. 3 taken generally along line 4—4.

However, improved testing techniques have shown that conventional constant height turbulator ribs disposed perpendicularly to the cooling air flow in a rectangular passage have spanwise heat transfer coefficients that are maximum near the centerline of the passage and decrease to lower values at the ends of the turbulator ribs adjacent to the walls of the passage. Accordingly, wall effects decrease the enhancement below that which would be expected for such ribs. In order to improve the spanwise enhancement of such conventional ribs disposed perpendicular to the cooling air flow, each of the ribs 44, as shown in FIG. 4 in accordance with the present invention, preferably has a configuration which varies along the span axis 46 between the rib first and second ends 44a and 44b for correspondingly varying at least one of the rib-to-passage height ratio e/H and the rib spacing-to-height ratio S/e to effect a varying convective heat transfer enhancement along the rib span axis 46 to offset or reduce such wall effects. By preferentially varying the configuration of the ribs 44, a more uniform spanwise distribution of enhancement may be obtained from the ribs 44 with an increased average enhancement therefrom than that from the constant height ribs.

As shown in FIGS. 3 and 4, each of the ribs 44 in this exemplary first embodiment is preferably straight and extends completely along the airfoil first side 20 in the midchord passage 32b from the first partition 40 formed integrally with the rib first end 44a to the second partition 42 formed integrally with the rib second end 44b. Each of the ribs 44 further includes a center section, or simply center, 44g which is disposed equidistantly between the rib first and second ends 44a and 44b, with the rib center 44g having a rib minimum height $e_{min}$. In this embodiment, both the rib first and second ends 44a and 44b have an equal rib maximum height $e_{max}$, with the rib height e decreasing from both the rib first and second ends 44a and 44b to the rib center 44g. In this way, the rib height e varies along the span axis 46 from the minimum value $e_{min}$ at the rib center 44g to a maximum value $e_{max}$ at the rib ends 44a and 44b for correspondingly varying the e/H ratio from a minimum value $(e/H)_{min}$ to a maximum value $(e/H)_{max}$, respectively, for also varying the enhancement between a minimum value and a maximum value. In the exemplary first embodiment illustrated in FIGS. 3 and 4, the ribs 44 are parallel to each other and the S/e ratio varies along the span axis 46 from a maximum value $(S/e)_{max}$ corresponding with the $(e/H)_{min}$ value at the rib center 44g to a minimum value $(S/e)_{min}$ corresponding with the $(e/H)_{max}$ value at the rib ends 44a and 44b. Since the ribs 44 remain parallel to each other and uniformly longitudinally spaced apart at the spacing S, a variation in the height e varies both the ratios e/H and S/e. However, since both these ratios vary as the rib height e varies, enhancement is also varied in response to each of these ratios.

Figure 6:
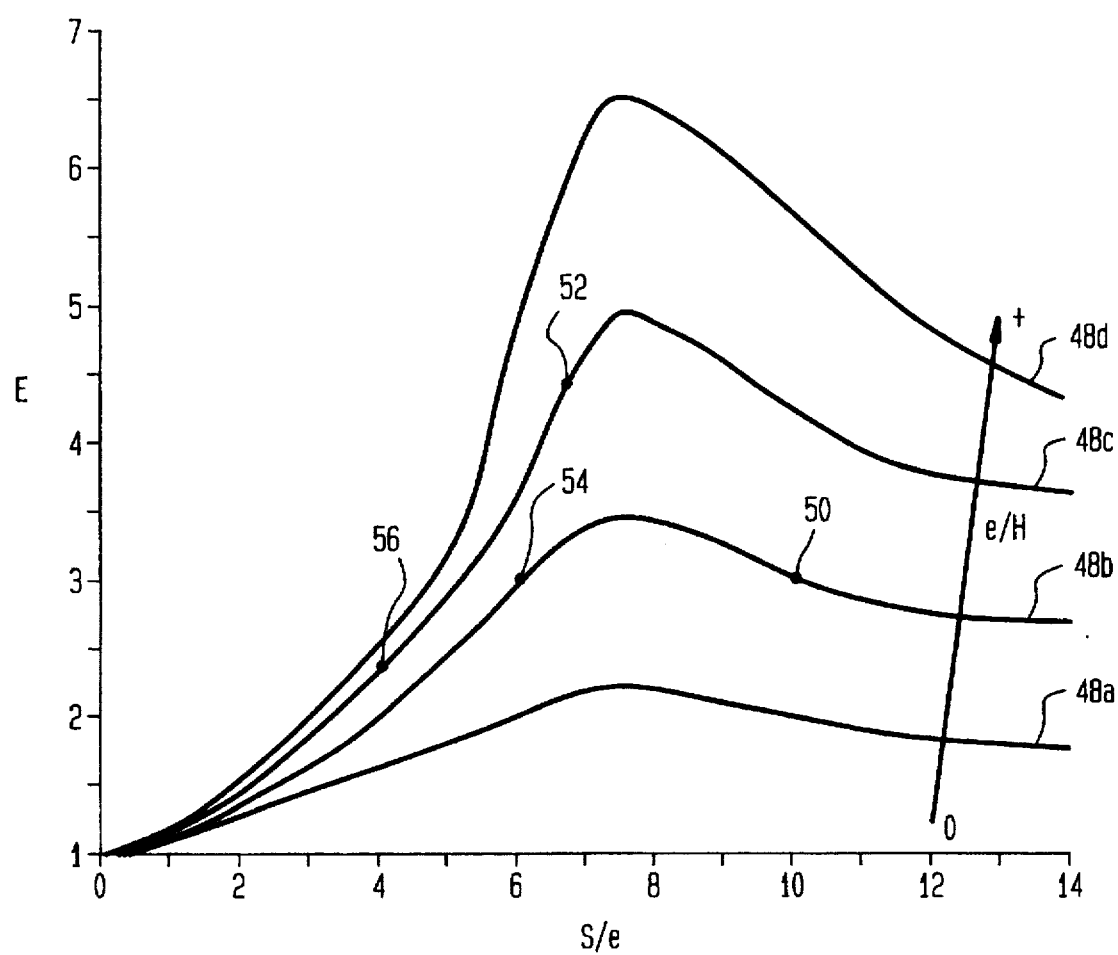
FIG. 6 is a graph plotting convective heat transfer enhancement E versus a rib longitudinal spacing-to-height ratio S/e for a family of rib-to-passage height ratios e/H.
Figure 8:
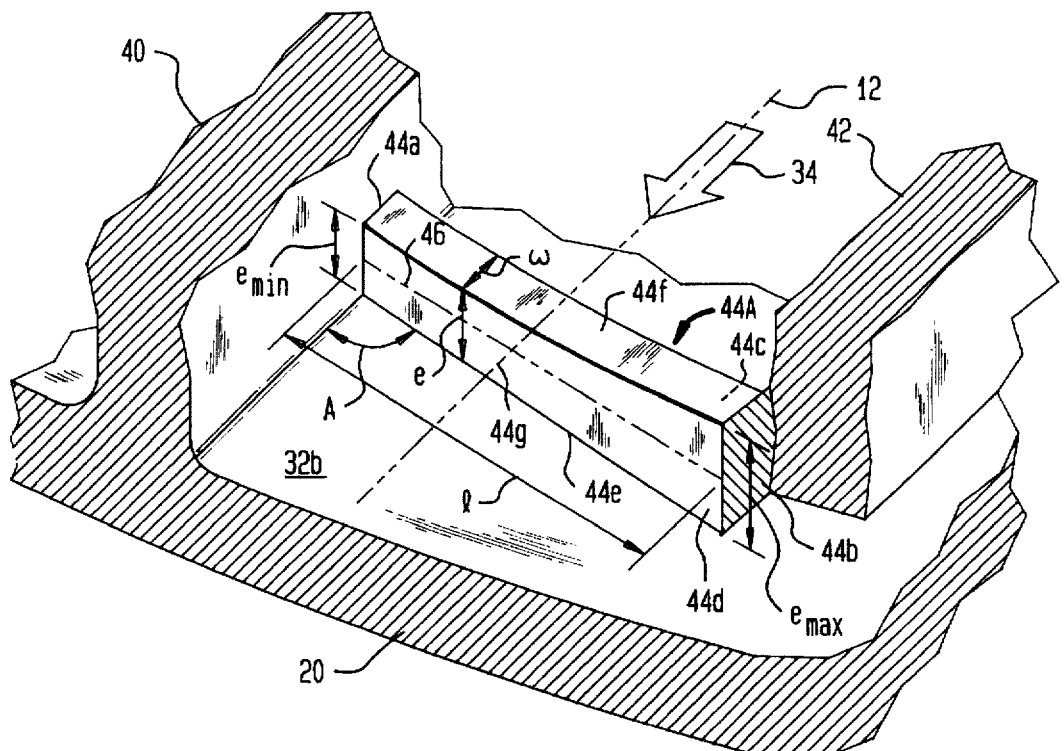
FIG. 8 is a perspective, partly sectional view of a portion of the midchord passage illustrated in FIG. 7 and taken generally along line 8—8.

More specifically, FIG. 6 illustrates an exemplary graph plotting enhancement E on the ordinate as represented by the conventional Nusselt ratios for turbulator ribs relative to a smooth wall without turbulator ribs. The ribs have a constant height e and are disposed in a generally rectangular flow passage having a height H between opposing walls thereof containing opposing ribs, and the ribs on each of the walls are longitudinally spaced apart at the longitudinal spacing S with the ribs on the opposing walls being staggered longitudinally. The abscissa represents the S/e ratio, and a family of curves at varying e/H values are plotted. Four exemplary enhancement curves 48a, 48b, 48c and 48d are plotted which correspond with increasing values of the e/H ratio.

For example, for a conventional turbulator rib having uniform height and width, and an S/e ratio of about 10, the graph indicates that an enhancement value E of about 3 may be obtained at a first point 50 for the second curve 48b at the e/H ratio associated therewith. Exemplary values of $e_{min}$ and $e_{max}$ for the turbulator ribs 44 illustrated in FIG. 4 are 0.25 mm and 0.38 mm, respectively, with the rib ends 44a and 44b being about 50% greater in height e than the rib center 44g. For a given or constant value of the height H, the ratio e/H correspondingly increases about 50% from the rib center 44g to the rib ends 44a, 44b, which in the graph illustrated in FIG. 6 is represented by the ratios e/H associated with the second curve 48b and the third curve 48c, respectively. By maintaining the longitudinal spacing S also as a given value, the S/e ratio must also correspondingly vary or decrease, by a third, in particular, from the S/e ratio of 10 at the first point 50 on the second curve 48b for the center 44g down to an S/e ratio of 6.7 at a second point 52 on the third curve 48c for the rib ends 44a, 44b.

Accordingly, by increasing the height e of the ribs 44 from the rib center 44g to the rib ends 44a and 44b in this example, the graph indicates that the resulting e/H ratio increases with a resulting decrease in the S/e ratio, and with a resulting increase in enhancement E from a minimum value of about 3 at the first point 50 to a maximum value of about 4.4 at the second point 52. In this way, the enhancement E may be varied along the span axis 46 of the ribs 44 to offset the wall effect described above for providing an increased average enhancement from the entire rib 44. The rib height e as shown in FIG. 4 preferably varies continuously from the rib center 44g to the rib ends 44a and 44b, and may vary continuously in a linear or nonlinear fashion as desired for particular embodiments.

However, since the exemplary enhancement curves illustrated in FIG. 6 are generally center-peaked at about a 7.5 S/e value and are a function of both ratios e/H and S/e, the particular configuration of the ribs 44 must be suitably selected to ensure an increase, and not a decrease in the resulting enhancement E at the rib ends 44a, 44b to offset the wall effect. For example, for a rib 44 having an S/e ratio of about 6 at the center 44g as represented by the third point 54 on the second curve 48b, an enhancement E of about 3 results. If the rib is similarly varied in height e from a minimum at the center 44g associated with the third point 52 to a maximum at the first and second ends 44a and 44b, the e/H ratio will again increase 50% and again fall on the third curve 48c, and the S/e ratio will again decrease by a third down to a different value of about 4.0 as represented by the fourth point 56. The resulting value of the enhancement E of about 2.4 at the rib ends 44a, 44b is less than the value of 3 at the rib center 44g, and is therefore unacceptably low for offsetting the wall effects.

Accordingly, for the example of the ribs 44 having the $(S/e)_{max}$ value of about 10 at the rib center 44g corresponding with $e_{min}$ and $(e/H)_{min}$ values, and the $(S/e)_{min}$ value of about 6.7 at the rib ends 44a and 44b corresponding with $e_{max}$ and $(e/H)_{max}$ values, an increase in the enhancement E will be effected at the rib ends 44a, 44b compared to the rib center 44g. However, for the ribs 44 having instead the $(S/e)_{max}$ value of about 6 at the center 44g, and the $(S/e)_{min}$ value of about 4 at the rib ends 44a and 44b, a corresponding decrease in the enhancement E will be effected, which is, therefore, not desirable. The graph in FIG. 6 indicates that for S/e values greater than about 7.5, an increase in rib height e and the e/H ratio will result in an increase in enhancement E. And, for S/e values less than about 7.5, an increase in rib height e and e/H ratios will effect a decrease in enhancement E. In order to take advantage of these relationships, the rib $(S/e)_{max}$ value should correspond with the minimum rib height $e_{min}$ and the $(e/H)_{min}$ value, with the $(S/e)_{min}$ value corresponding with the maximum rib height $e_{max}$ and the $(e/H)_{max}$ value. And, for S/e values greater than about 7.5, the rib maximum height $e_{max}$, the $(e/H)_{max}$ value and $(S/e)_{min}$ value should correspond with the rib ends 44a, 44b (e.g. the second point 52) for providing the maximum enhancement value therefrom to offset the degrading wall effect, with the minimum rib height $e_{min}$, the $(e/H)_{min}$ value and the $(S/e)_{max}$ value corresponding with the rib center 44g (e.g. the first point 50) for the first embodiment shown in FIG. 4 for providing the minimum enhancement value therefrom.

The family of enhancement curves illustrated in FIG. 6 may be conventionally prepared for particular turbulator rib designs for determining the required variation in rib configuration for ensuring an increase in the enhancement E as desired. Since the ribs 44 are preferably uniformly spaced apart in a constant passage, the values H and S remain constant and any variation in rib height e varies both ratios e/H and S/e which vary enhancement. Therefore, graphs such as the one shown in FIG. 6 may be conventionally prepared, by testing for example, to determine the effect on enhancement E due to varying rib height e for selecting that rib configuration which will increase enhancement at the rib ends 44a, 44b to offset the wall effect. The first embodiment shown in FIG. 4 is but one example.

Figure 5:
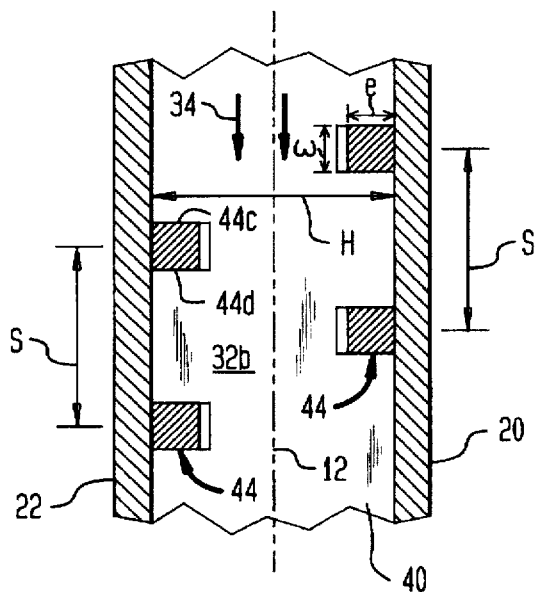
FIG. 5 is longitudinal sectional view of a portion of the midchord passage illustrated in FIG. 2 taken along 5—5.
Figure 5A:
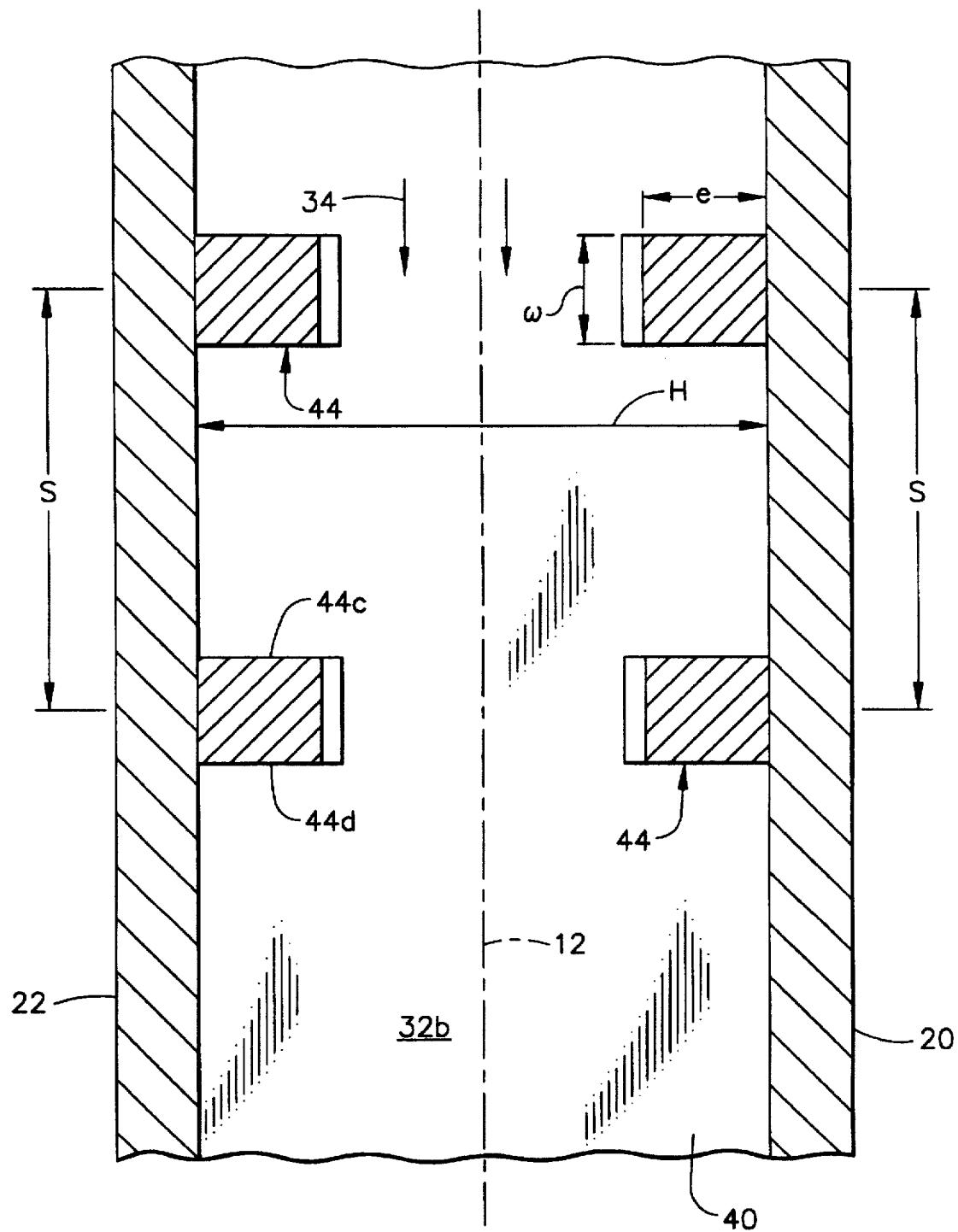
FIG. 5A is an alternate embodiment of the present invention depicted in FIG. 5.

As shown in FIG. 5, the ribs 44 are preferably disposed also on the airfoil second side 22 and staggered longitudinally relative to the ribs 44 and the airfoil first side 20. The ribs 44 on both sides 20 and 22 are preferably identical to each other with one of the ribs 44 on the second side 22 being disposed generally equally longitudinally between adjacent ones of the ribs 44 on the first side 20. Such staggering is conventional, and the ribs 44 may, alternatively, be also disposed longitudinally in-line with each other between the two sides 20 and 22 as is also conventionally known; see FIG. 5A.

As shown in FIG. 2, since the opposing ribs 44 have maximum rib heights $e_{max}$ adjacent to the first and second partitions 40 and 42 and minimum rib heights $e_{min}$ at the respective rib center 44g, the projected flow area between the opposing ribs 44 increases in value from minimum values adjacent to the first and second partitions 40 and 42 to a maximum value at the center of the midchord passage 32b therebetween.

Illustrated in FIGS. 7–10 is a second embodiment of the invention including a plurality of turbulator ribs designated 44A which are also straight but inclined at an acute angle A relative to the direction of the cooling air 34, which in the embodiment illustrated may be measured relative to the first partition 40 or the longitudinal axis 12. As so inclined, the rib first end 44a is disposed upstream of the rib second end 44b in the midchord passage 32b for first receiving the cooling air 34 channeled therethrough. Corresponding portions of the turbulator ribs 44A use the same designations as those used for the ribs 44, i.e. 44a through 44f and the span axis 46.

Figure 7:
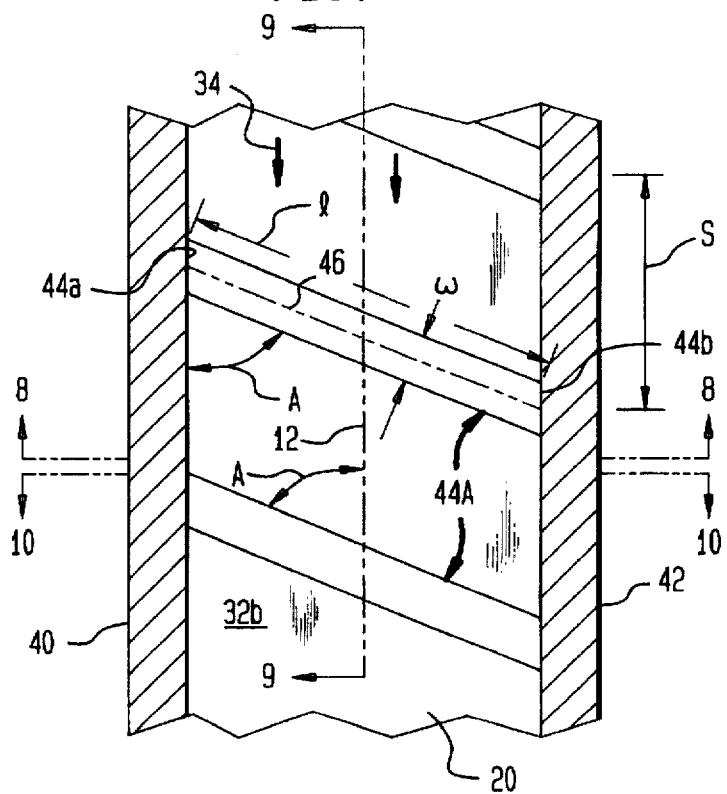
FIG. 7 is a longitudinal, partly sectional view of a portion of the midchord passage illustrated in FIG. 1 showing turbulator ribs in accordance with a second embodiment of the present invention.

Referring to FIG. 7, tests have shown that for a uniformly sized conventional, inclined turbulator rib, enhancement E decreases in value downstream from the rib along its span axis, such as the span axis 46, from relatively high values adjacent to the rib upstream first end 44a to lower values thereof adjacent to the rib downstream second end 44b. In order to compensate for this decrease in enhancement due to the inclination of the rib relative to the flow of the cooling air 34, the rib 44A in accordance with the second embodiment of the present invention has its height e preferably continuously increasing, either linearly or nonlinearly as desired, from a minimum height $e_{min}$ at the rib first end 44a to a maximum height $e_{max}$ at the rib second end 44b. In this way, the ratios e/H and S/e also correspondingly vary along the span axis 46 of the ribs 44A with the former increasing, and the latter decreasing. A corresponding family of enhancement curves, such as those illustrated in FIG. 6, may also be conventionally prepared for inclined turbulator ribs for ensuring that the enhancement E is increased from the rib first end 44a to the rib second end 44b for offsetting the reduction in enhancement due to the inclination of the ribs 44A.

Figure 9:
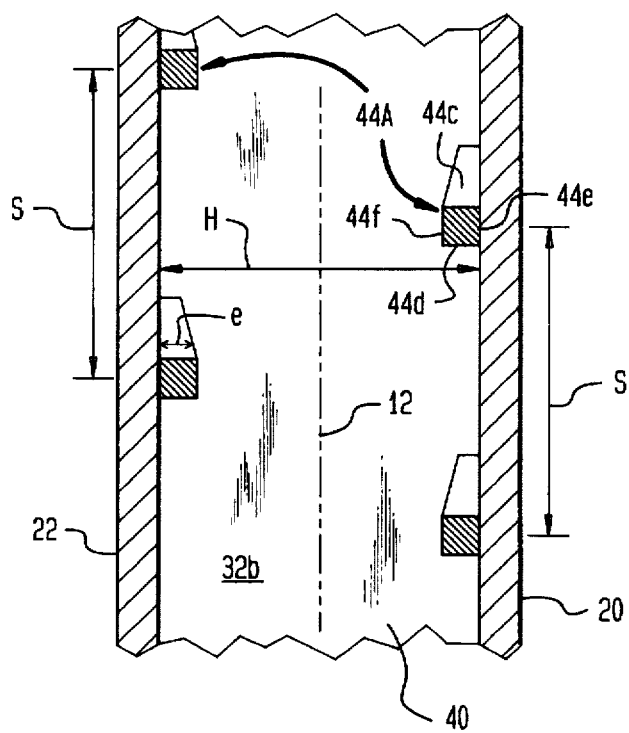
FIG. 9 is a longitudinal sectional view of the midchord passage illustrated in FIG. 7 taken along line 9—9.
Figure 9A:
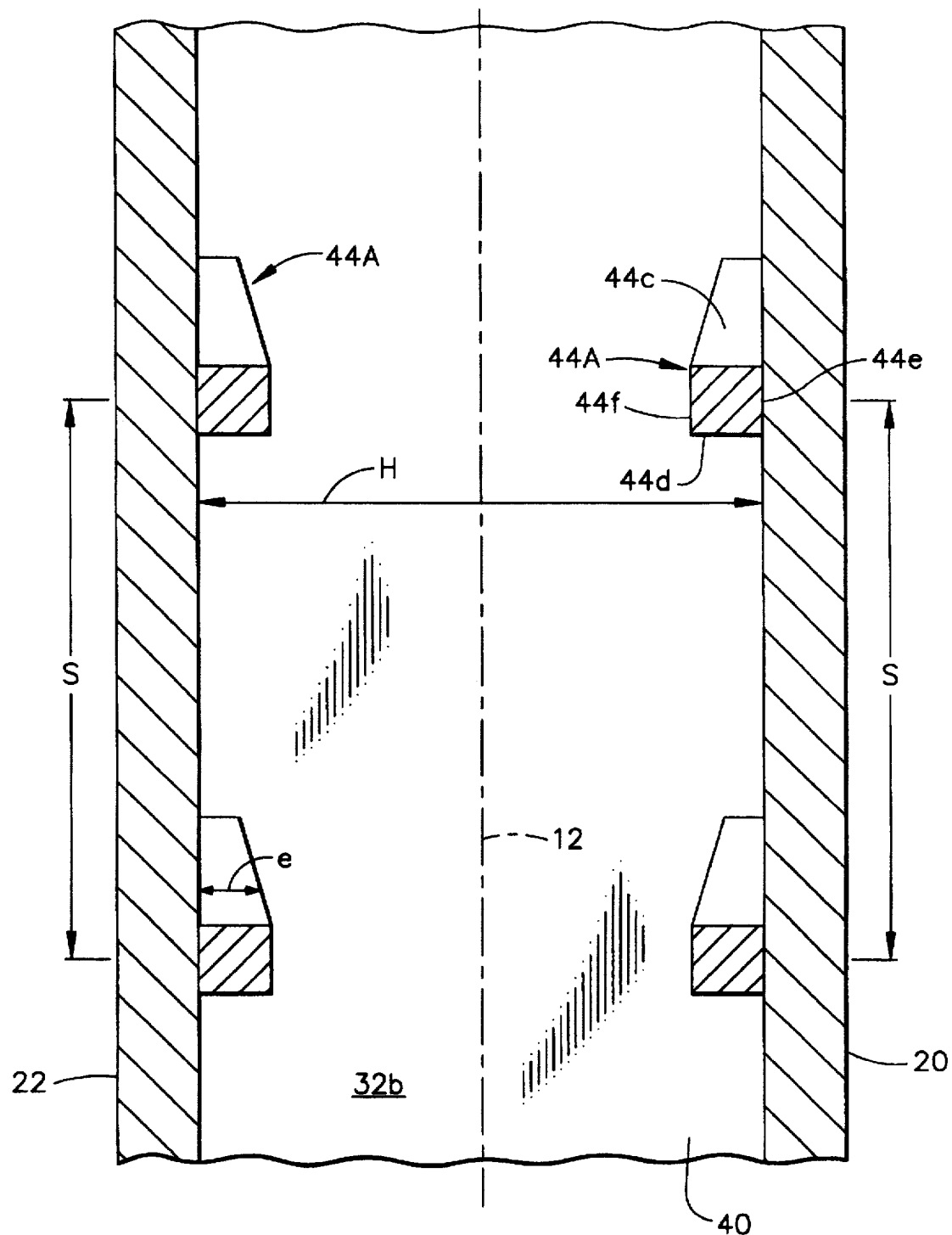
FIG. 9A is an alternate embodiment of the present invention depicted in FIG. 9.
Figure 9B:
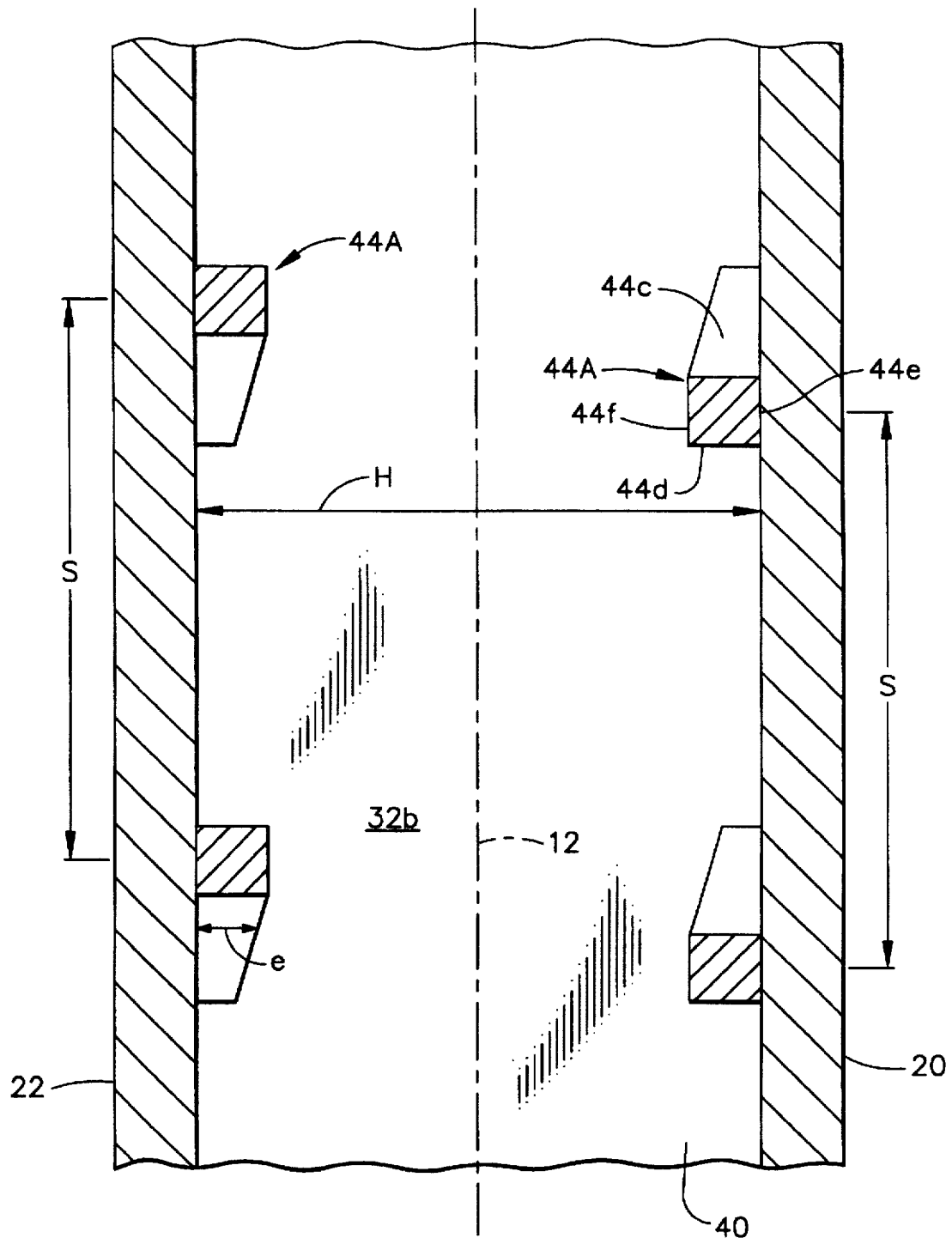
FIG. 9B is yet another embodiment of the present invention depicted in FIG. 9.
Figure 10:
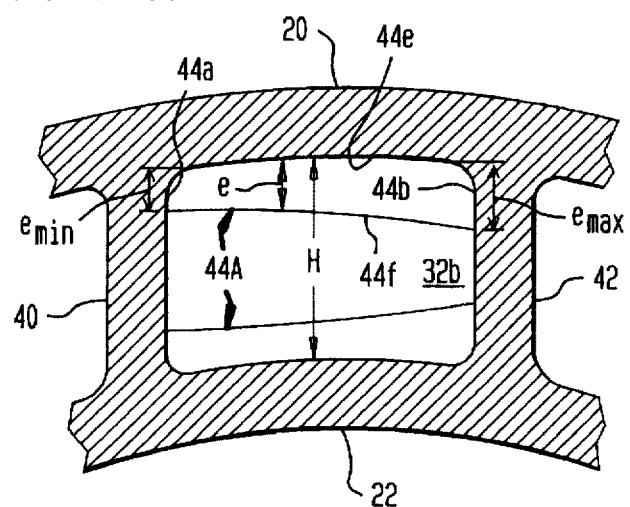
FIG. 10 is an enlarged transverse, partly sectional view of the midchord passage illustrated in FIG. 7 taken along line 10—10 showing both sides of the blade.
Figure 10A:
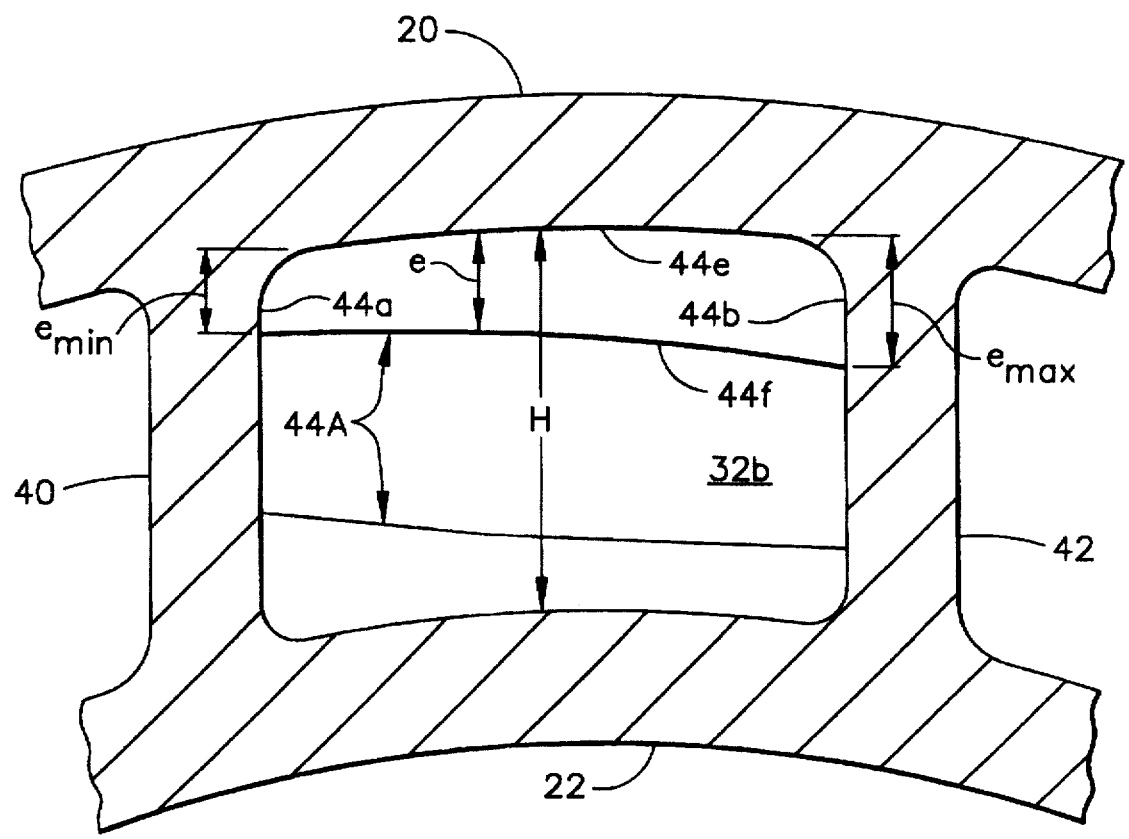
FIG. 10A is an alternate embodiment of the present invention depicted in FIG. 10.

In this exemplary second embodiment, the ribs 44A also preferably extend completely along the airfoil first side 20 in the midchord passage 32b from the first partition 40 to the second partition 42. The ribs 44A are also preferably disposed also on the airfoil second side 22, as shown in FIGS. 9 and 10, with the ribs on the opposing airfoil first and second sides 20 and 22 being either longitudinally staggered relative to each other as shown, or disposed longitudinally in-line or criss-crossed as desired as depicted in FIGS. 9A and 9B, respectively. As shown in FIG. 10, for the generally rectangular midchord passage 32b, since the opposing ribs 44A are identically inclined in the midchord passage 32b, they both increase in rib height e from the first partition 40 to the second partition 42 thusly decreasing the projected flow area therebetween from a maximum value adjacent to the first partition 40 to a minimum value adjacent to the second partition 42. However, in the criss-crossed configuration, the projected flow area therebetween would be generally constant as shown in FIG. 10A.

Figure 11:
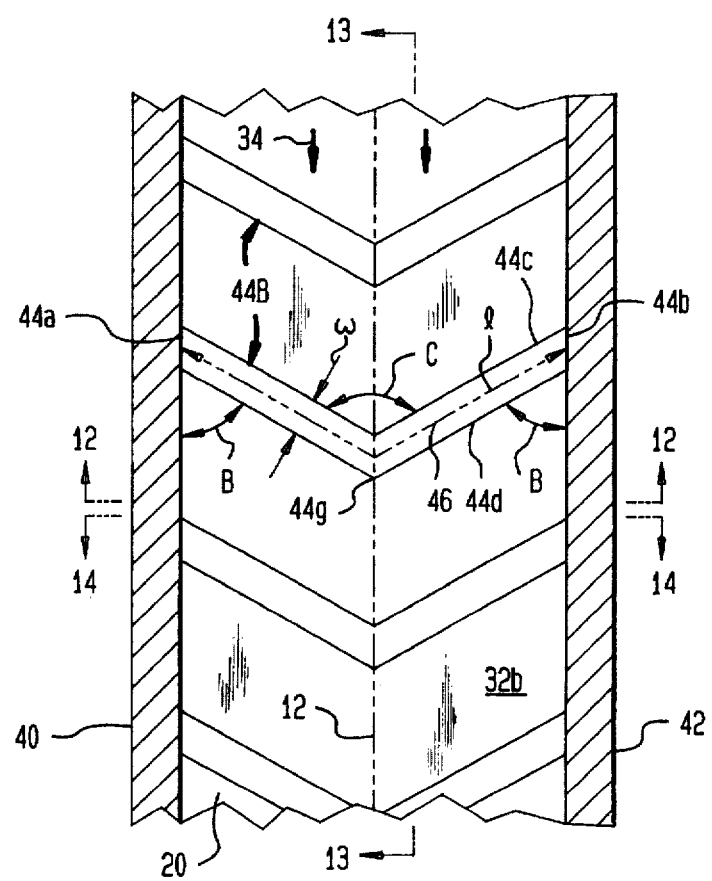
FIG. 11 is a longitudinal, partly sectional view of a portion of the midchord passage illustrated in FIG. 1 showing turbulators in accordance with a third embodiment of the present invention.
Figure 12:
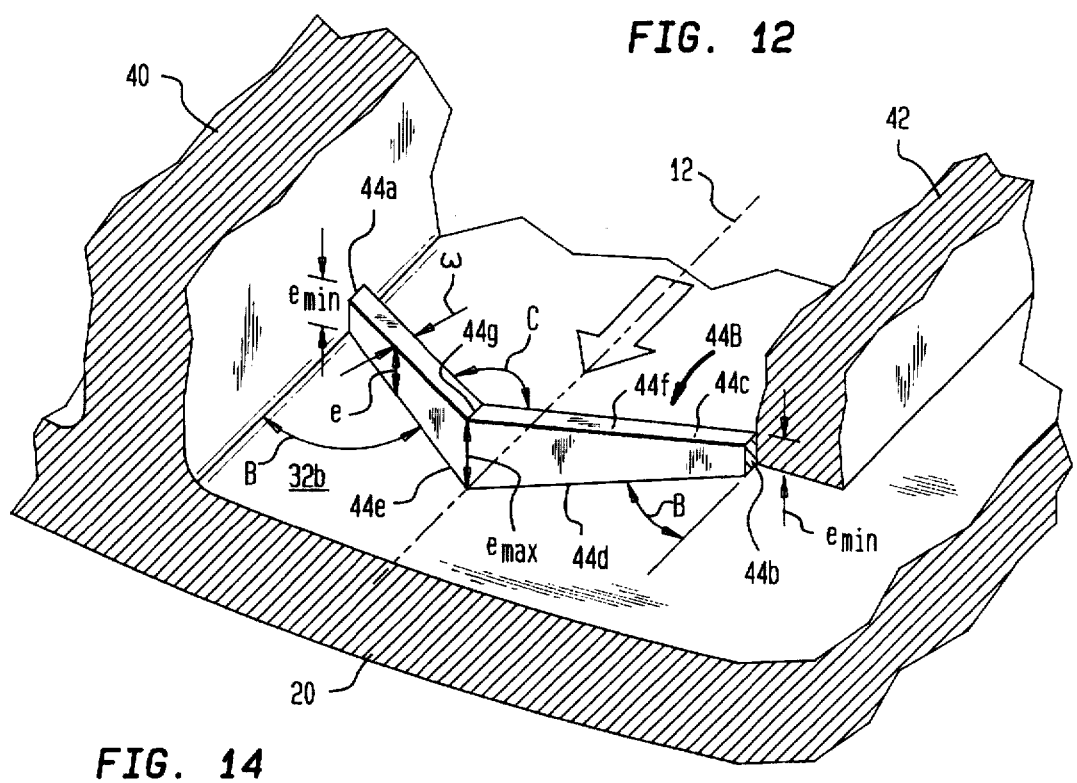
FIG. 12 is a perspective, partly sectional view of the midchord passage illustrated in FIG. 11 taken generally along line 12—12.
Figure 13:
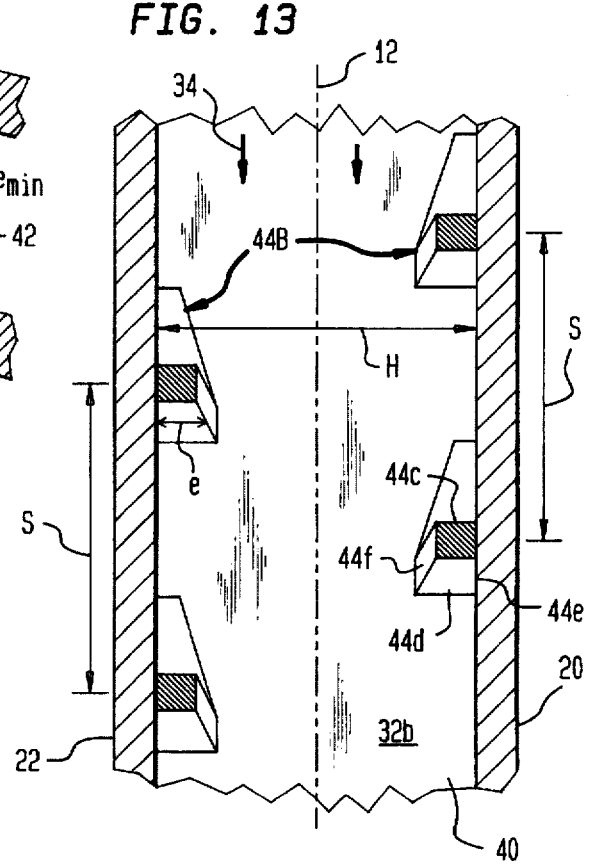
FIG. 13 is a longitudinal, partly sectional view of the midchord passage illustrated in FIG. 11 taken along line 13—13.
Figure 13A:
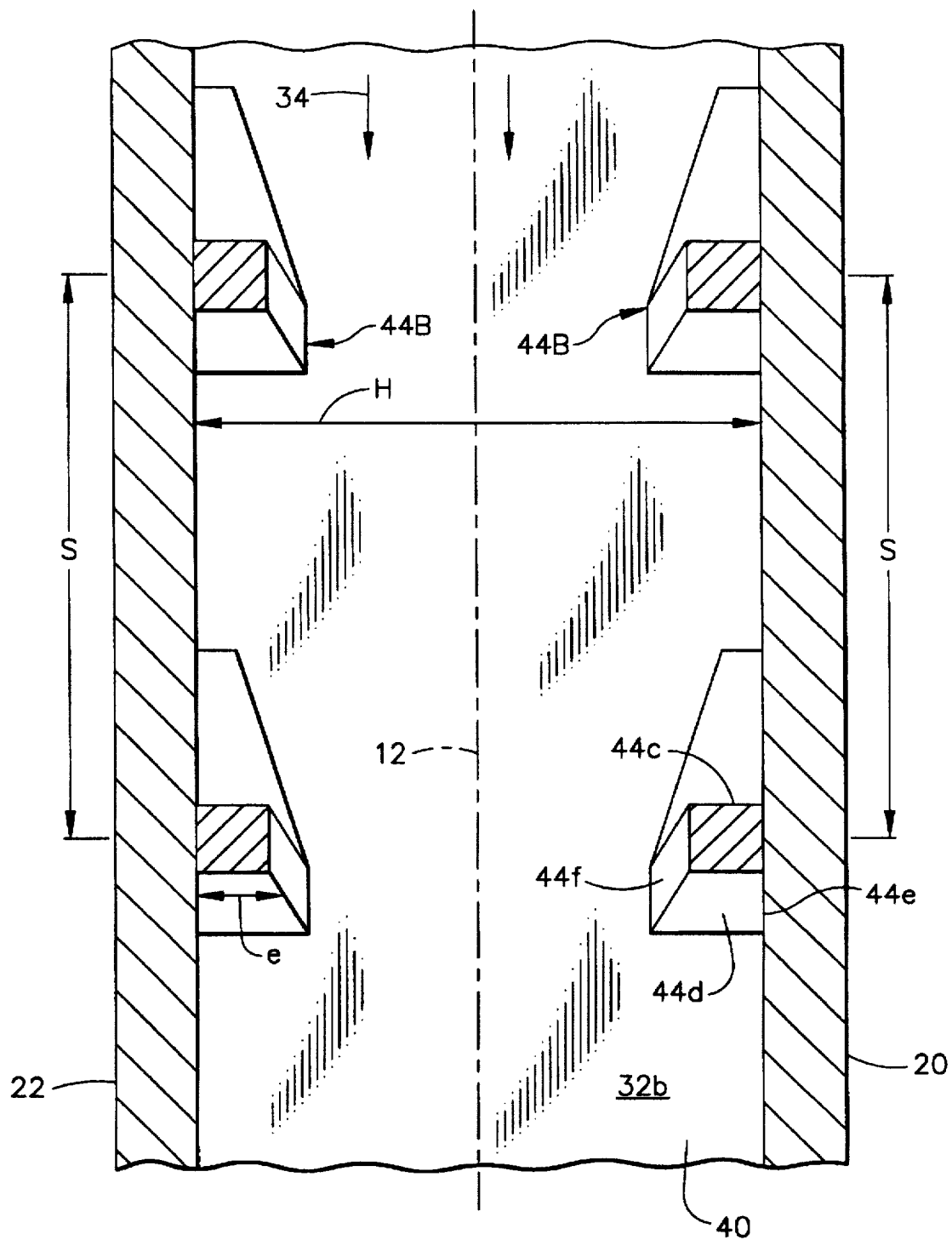
FIG. 13A is an alternate embodiment of the present invention depicted in FIG. 13.

Illustrated in FIGS. 11–14 is a third embodiment of the present invention wherein the ribs are designated 44B, and similarly use the corresponding designations for the portions thereof, i.e. 44a through 44f with a V-shaped span axis 46. In this embodiment of the invention, each of the ribs 44B is V-shaped wherein the center 44g is a center apex disposed equidistantly between the rib first and second ends 44a and 44b, with the apex 44g pointing downstream in the midchord passage 32b so that the rib first and second ends 44a and 44b are disposed upstream of the center apex 44g for first receiving the cooling air 34 channeled through the midchord passage 32b. Each side of the ribs 44B is inclined relative to the direction of the cooling air 34, and in the embodiment illustrated in FIG. 11 are inclined at acute angles B relative to the respective first and second partitions 40 and 42, with an included obtuse angle C measured between the rib upstream first side 44c relative to the center apex 44g. Each of the ribs 44B preferably extends completely along the airfoil first side 20 in the midchord passage 32b, and, as shown in FIG. 13, the ribs 44B are disposed also on the airfoil second side 40 in the midchord passage 32b and are preferably longitudinally staggered relative to the ribs 44B on the airfoil first side 20, but in alternate embodiments they may be disposed longitudinally in-line therewith as depicted in FIG. 13A.

Uniformly sized V-shaped turbulator ribs are conventionally known. However, tests have shown that enhancement varies along the span thereof, such as the span 46, with relatively high values thereof adjacent to both the first and second partitions 40 and 42, and decreasing to relatively low values at the center apex thereof (as compared to such high values). Accordingly, and in accordance with the present invention, the rib height e of the ribs 44B may be selectively varied as described above for the first and second embodiments for correspondingly varying the enhancement effected by the ribs 44B. In a preferred embodiment, the rib center apex 44g as shown in FIG. 12, for example, has the maximum rib height $e_{max}$, and both the rib first and second ends 44a and 44b have the minimum rib height $e_{min}$, with the rib height e increasing from the rib first and second ends 44a, 44b to the rib center apex 44g. The rib height e preferably continuously increases from the rib ends 44a, 44b toward the rib center apex 44g either linearly or non-linearly as desired for correspondingly varying the e/H ratio. Again, a graph such as that shown in FIG. 6 may be conventionally generated for V-shaped turbulator ribs such as the ribs 44B for determining the effects of the ratios e/H and S/e on enhancement. In this way, the ribs 44B may be suitably varied in configuration for increasing the enhancement effected by the ribs 44B from the rib first and second ends 44a and 44b to the rib center apex 44g.

Figure 14:
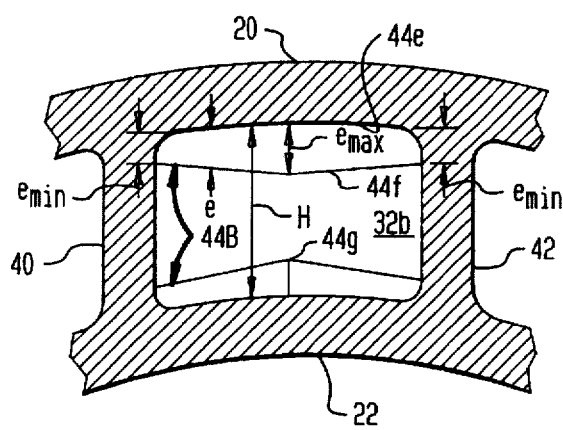
FIG. 14 is an enlarged transverse, partly sectional view of the midchord passage illustrated in FIG. 11 taken along line 14—14 showing both sides of the blade.

As shown in FIG. 14, this exemplary third embodiment of the ribs 44B increases in rib height e from minimum values $e_{min}$ adjacent to the first and second partitions 40 and 42 to the maximum value $e_{max}$ at the center apex 44g for increasing enhancement at the rib center apex 44g for offsetting the local enhancement degradation due to the V-shaped configuration of the ribs 44B. Also as shown in FIG. 14, the projected flow area of the midchord passage 32b varies from maximum values adjacent to the first and second partitions 40 and 42 to a minimum value between opposing rib center apexes 44g.

In all three embodiments of ribs 44, 44A, and 44B disclosed above, the rib configurations, for example the rib height e, may be selectively varied for varying the enhancement effected by the ribs for compensating for the observed reduction in enhancement found in uniformly sized conventional ribs. For example, the observed enhancement degradation adjacent to the rib ends 44a, 44b of perpendicular-to-flow ribs such as the ribs 44 illustrated in FIG. 4 may be compensated for by selectively increasing the rib height adjacent to the first and second partitions 40 and 42 in the first embodiment. In the second embodiment illustrated in FIG. 8, the observed enhancement degradation adjacent to the downstream end 44b of the inclined turbulator rib 44A may be compensated for by selectively increasing the height of the rib 44A adjacent to the second partition 42 at the rib downstream second end 44b. And, in the third embodiment illustrated in FIG. 12, the observed enhancement degradation adjacent to the center apex 44g of the V-shaped turbulator rib 44B may be compensated for by increasing the height of the ribs 44C adjacent to the center apex 44g. As indicated above, the required variation in rib height e for a particular turbulator rib design for effecting an increase in enhancement is related to both the e/H and S/e ratios as represented by the exemplary family of curves illustrated in FIG. 6. Such curves may be conventionally generated for particular rib designs for determining the particular variation in rib height e which will effect the required increase in enhancement from the resulting e/H and S/e ratios. The three embodiments disclosed above are merely exemplary, with the invention applying also to other embodiments under the teachings herein.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A turbine engine blade having a longitudinal axis comprising:
   an airfoil having a first side and an opposite second side joined together at a leading edge and a trailing edge and extending longitudinally from a root to a tip, and an internal passage extending longitudinally between said airfoil first and second sides for channeling air to cool said airfoil;
   a plurality of turbulator ribs extending from said first side into said passage and having substantially identical configurations in said passage including:
      opposite first and second ends having a span axis extending therebetween and a length measured along said span axis;
      opposite first and second sides having a width therebetween measured transversely to said span axis;
      a base and a tip having a height e therebetween measured perpendicularly from said airfoil first side;
   said passage having a height H measured between said airfoil first and second sides at said rib for defining a rib-to-passage height ratio e/H;
   adjacent ones of said ribs being spaced longitudinally apart in said passage at a longitudinal spacing S for defining a rib spacing-to-height ratio S/e; and
   said rib configuration varying along said span axis between said rib first and second ends for correspondingly varying at least one of said rib-to-passage height ratio e/H and said rib spacing-to-height ratio S/e to effect a varying convective heat transfer enhancement along said rib span axis.

2. A blade according to claim 1 wherein said rib height e varies along said span axis from a minimum value $e_{min}$ to a maximum value $e_{max}$ for correspondingly varying said e/H ratio from a minimum value $(e/H)_{min}$ to a maximum value $(e/H)_{max}$, respectively, and for varying said enhancement between a minimum value and a maximum value.

3. A blade according to claim 2 wherein said ribs are parallel to each other and said S/e ratio varies along said span axis from a maximum value $(S/e)_{max}$ corresponding with said $(e/H)_{min}$ value to a minimum value $(S/e)_{min}$ corresponding with said $(e/H)_{max}$ value.

4. A blade according to claim 3 wherein said enhancement maximum value corresponds with said $(e/H)_{max}$ value and said $(S/e)_{min}$ value, and said enhancement minimum value corresponds with said $(e/H)_{min}$ value and said $(S/e)_{max}$ value.

5. A blade according to claim 4 wherein:

said passage channels said air parallel to said longitudinal axis and said ribs are disposed perpendicularly to said longitudinal axis;

each of said ribs is straight and includes a center disposed equidistantly between said rib first and second ends, and said center having said rib minimum height $e_{min}$; and both said rib first and second ends have said rib maximum height $e_{max}$, with said rib height decreasing from said rib first and second ends to said rib center.

6. A blade according to claim 5 wherein said ribs extend completely along said airfoil first side in said passage.

7. A blade according to claim 4 wherein:

said passage channels said air parallel to said longitudinal axis;

each of said ribs is straight and inclined so that said rib first end is disposed upstream of said rib second end in said passage for first receiving said cooling air channeled therethrough;

said rib first end has said rib minimum height $e_{min}$; and said rib second end has said rib maximum height $e_{max}$.

8. A blade according to claim 7 wherein said ribs extend completely along said airfoil first side in said passage.

9. A blade according to claim 4 wherein:

said passage channels said air parallel to said longitudinal axis;

each of said ribs is V-shaped and includes a center apex disposed equidistantly between said rib first and second ends and pointing downstream in said passage so that said rib first and second ends are disposed upstream of said center apex for first receiving said cooling air channeled through said passage;

said rib center apex has said rib maximum height $e_{max}$; and both said rib first and second ends have said rib minimum height $e_{min}$, with said rib height increasing from said rib first and second ends to said rib center apex.

10. A blade according to claim 9 wherein said ribs extend completely along said airfoil first side in said passage.

* * * * *